United States Patent
Kusaka et al.

(10) Patent No.: US 6,898,005 B2
(45) Date of Patent: May 24, 2005

(54) MICROSCOPE ILLUMINATION OPTICAL SYSTEM

(75) Inventors: Kenichi Kusaka, Hachioji (JP); Kazuhiro Hayashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/988,610

(22) Filed: Nov. 16, 2004

(65) Prior Publication Data

US 2005/0088733 A1 Apr. 28, 2005

Related U.S. Application Data

(62) Division of application No. 10/115,144, filed on Apr. 4, 2002, now Pat. No. 6,836,358.

(30) Foreign Application Priority Data

Jun. 6, 2001 (JP) .................................... 2001-171312

(51) Int. Cl.[7] .............................................. G02B 21/06
(52) U.S. Cl. ...................................... 359/388; 359/385
(58) Field of Search ................................. 359/385–389, 359/434, 656–661

(56) References Cited

U.S. PATENT DOCUMENTS

| | | | |
|---|---|---|---|
| 4,397,529 A | 8/1983 | Taira | |
| 4,511,223 A | * 4/1985 | Hirose | 362/268 |
| 5,654,832 A | * 8/1997 | Kawasaki et al. | 359/794 |
| 5,777,784 A | 7/1998 | Tanaka | |
| 6,212,005 B1 | 4/2001 | Kawasaki et al. | |

FOREIGN PATENT DOCUMENTS

| | | | |
|---|---|---|---|
| JP | 44-4513 | | 2/1969 |
| JP | 8-122643 | | 5/1996 |
| JP | 9-90232 | | 4/1997 |
| JP | 10-232353 | * | 9/1998 |
| JP | 2000-10012 | | 1/2000 |

* cited by examiner

Primary Examiner—Mark A. Robinson
Assistant Examiner—Alessandro Amari
(74) Attorney, Agent, or Firm—Arnold International; Bruce Y. Arnold

(57) ABSTRACT

An illumination optical system for a microscope is provided wherein the illumination state can be successively changed between Koehler illumination and critical illumination while ensuring one or more conditions are satisfied so that the image of the light source illuminates an appropriately large region of the field of view of the microscope during critical illumination. Preferably, no cemented lens elements are used so that degradation of the cement caused by ultraviolet light sources is avoided, thereby enabling an appropriate illumination type to be provided at will and without degradation of the optical components of the illumination optical system over time.

4 Claims, 8 Drawing Sheets

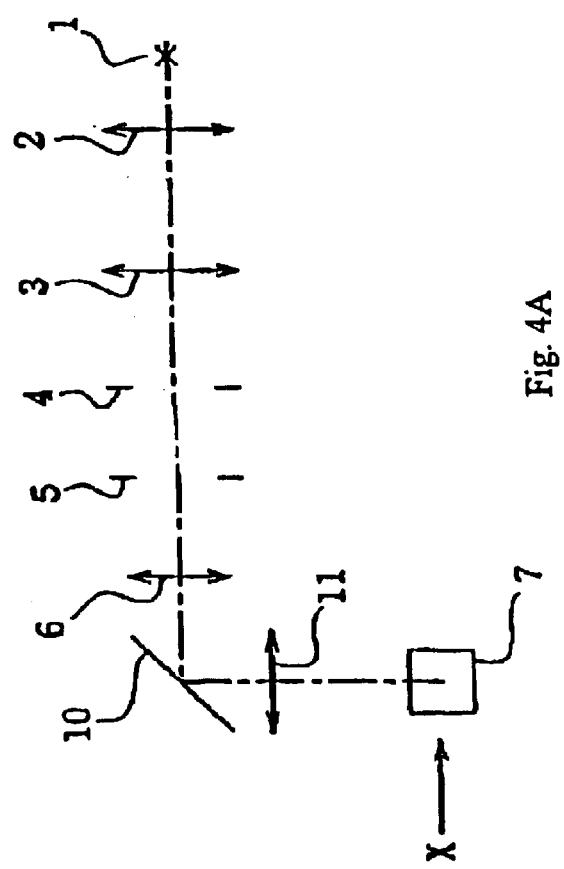
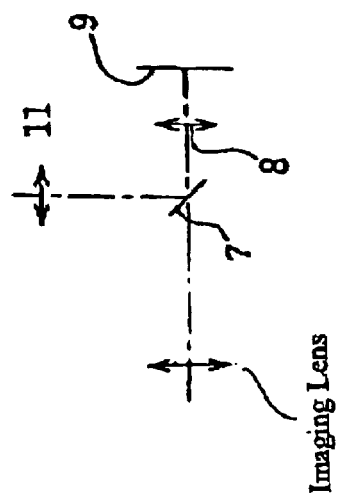
Fig. 4A
Fig. 4B

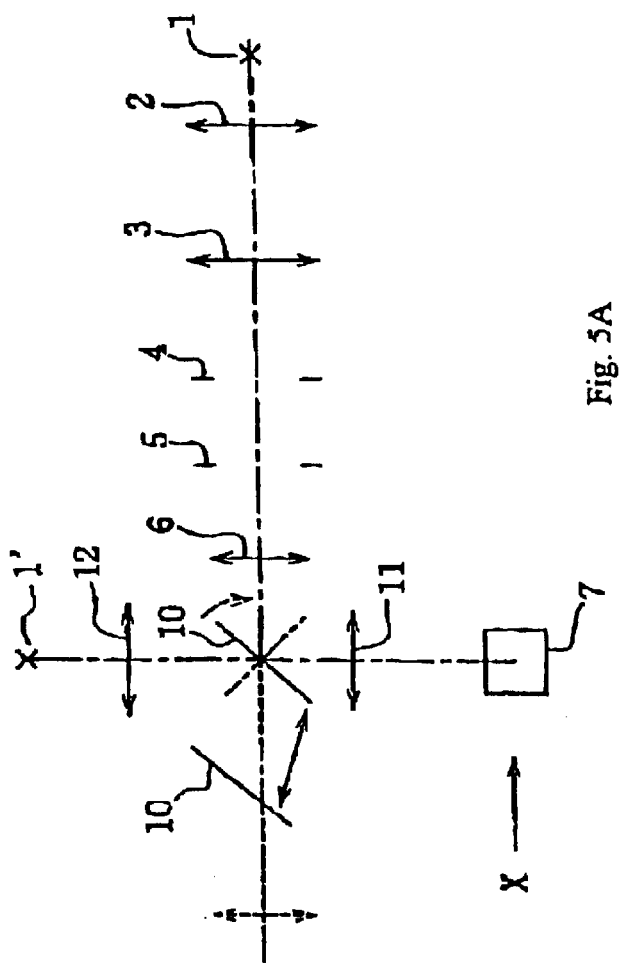
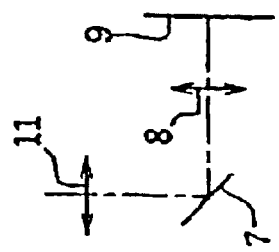
Fig. 5A
Fig. 5B

MICROSCOPE ILLUMINATION OPTICAL SYSTEM

This is a divisional application of allowed U.S. Application Ser. No. 10/115,144 filed Apr. 4, 2002 now U.S. Pat. No. 6,836,358, the benefit of priority of which is hereby claimed under 35 U.S.C. § 120.

BACKGROUND OF THE INVENTION

In general, Koehler illumination optical systems are widely used as the illumination optical system for microscopes because it makes the brightness of the field of view uniform FIG. 7 shows the basic construction in the case where a Koehler illumination optical system is used with a microscope to illuminate an object using light that is incident substantially normal to a support surface 9 which supports an object of interest. In FIG. 7, a light source 1 emits illumination light which is gathered by a collector lens 2 and passes this light via a first illumination lens 3 an aperture stop 4 a field stop 5 a second illumination lens 6, a dichroic mirror 7 (which may instead be a beam splitter), and an object lens 8 to a sample surface 9. The collector lens 2 the first illumination lens 3 the aperture stop 4 the field stop 5 and the second illumination lens 6 form the illumination lens system.

As compared to the viewing area obtainable by using one's eyes to view a magnified image of a sample by looking into a microscope, only a more narrow viewing area in the vicinity of the center of the field of view can be observed using, for example, a CCD to capture the image and to output the image data to a display, such as a T.V. monitor. For an illumination optical system for a microscope that is more suitable for T.V. viewing, what is termed 'critical illumination' is often used. This type of illumination optical system projects an image of a light source onto a center portion of a sample surface to be viewed, brightly illuminating the center portion of the field of view.

As shown in FIG. 8A, a magnified image of a sample positioned at sample surface 9 may be viewed in reflected light using the objective lens 8 and an imaging lens (tube lens). In this case, the reflecting illumination optical system is formed of the light source 1, the illumination lens system (composed of the components 2–6, discussed previously), the dichroic mirror 7, and the objective lens 8. As shown in FIG. 8B, a magnified image of a sample positioned at a sample surface 9 may be viewed in transmitted light using an objective lens and an imaging lens. In this case, the transmitting illumination optical system is formed of the light source 1, the illumination lens system, the dichroic mirror 7, and a condenser lens. Because the components of the illumination lens system are the same as in the Koehler illumination optical system shown in FIG. 7, the components themselves will not be separately discussed with regard to the illumination optical systems shown in FIGS. 8A and 8B. In FIGS. 8A and 8B, the illumination light that is incident onto the sample surface 9 that supports a sample is not collimated, as in the case of Koehler illumination illustrated in FIG. 7. Instead, a focused image of the light source is projected onto the sample surface 9. This is termed critical illumination.

The light source used for a microscope is generally a halogen lamp or an arc-discharge lamp, both of which have a small region that emits a high intensity light beam. For example, this region for an arc-discharge lamp typically measures about 0.6 mm in diameter. If an arc-discharge lamp is used in Koehler illumination, the projected image of the lamp is generally too small to fill the pupil of the objective lens of the microscope, and thus the brightness of the field of view decreases. Therefore, there has been a problem using a Koehler illumination optical system as shown in FIG. 7 in that both the required illumination field (i.e. the area of illumination) and the required brightness of illumination cannot be simultaneously provided. However, using a critical-type illumination optical system as illustrated in FIG. 8A for viewing the sample using reflected light, or as illustrated in FIG. 8B for viewing the sample using transmitted light, also has problems in that only the center portion of the field of view can be brightly illuminated. Thus, neither type of illumination optical system is fully satisfactory in terms of practical usage.

An illumination optical system for a microscope is provided with a light source, an illumination lens system which gathers light from the light source and directs the light along a light path, and an object optical system which converges the light beams from the illumination lens system so as to illuminate a sample for observation with a microscope using either transmitted or reflected light. The object optical system is formed of the objective lens 8, as shown in FIG. 8A, in the case of using reflected light to view a sample. In the case of using transmitted light to view a sample, the object optical system is instead formed of a condenser lens, as illustrated in FIG. 8B.

The microscope optical system includes an objective lens and an imaging lens that, together, form a magnified image of the sample. In the case of using reflected light to view a sample, the objective lens 8 (FIG. 8A), serves a dual role. It not only serves as part of the illumination optical system to converge the light from the illumination lens system that is to illuminate the sample, it also serves as the objective lens of the microscope to gather the light reflected by the sample and to direct the light to the imaging lens of the microscope.

BRIEF SUMMARY OF THE INVENTION

In the present invention, either Koehler or critical illumination can be provided to a sample, at will, and the change in illumination type is achieved by changing the spacings of one or more optical components or by moving the position of the light source. The object of the present invention is to provide an illumination optical system for a microscope wherein the illumination state can be changed at will between Koehler illumination and critical illumination, and vice-versa, so as to provide an illumination field and brightness which is most appropriate for a given observation, and which uses optical components that will not be harmed by exposure to ultraviolet light.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A and 4B show the basic optical component configuration of the illumination optical system of a third embodiment of the invention. FIG. 4B is a partial view of some of the optical components shown in FIG. 4A as seen by looking in the direction of the arrow X in FIG. 4A;

FIGS. 5A and 5B show the basic optical component configuration of the illumination optical system of a fourth embodiment of the invention. FIG. 5B is a partial view of some of the optical components shown in FIG. 5A as seen by looking in the direction of the arrow X in FIG. 5A;

FIG. 6B is a partial view of some of the optical components shown in FIG. 6A as seen by looking in the direction of the arrow X in FIG. 6A;

DETAILED DESCRIPTION

Figure 1:
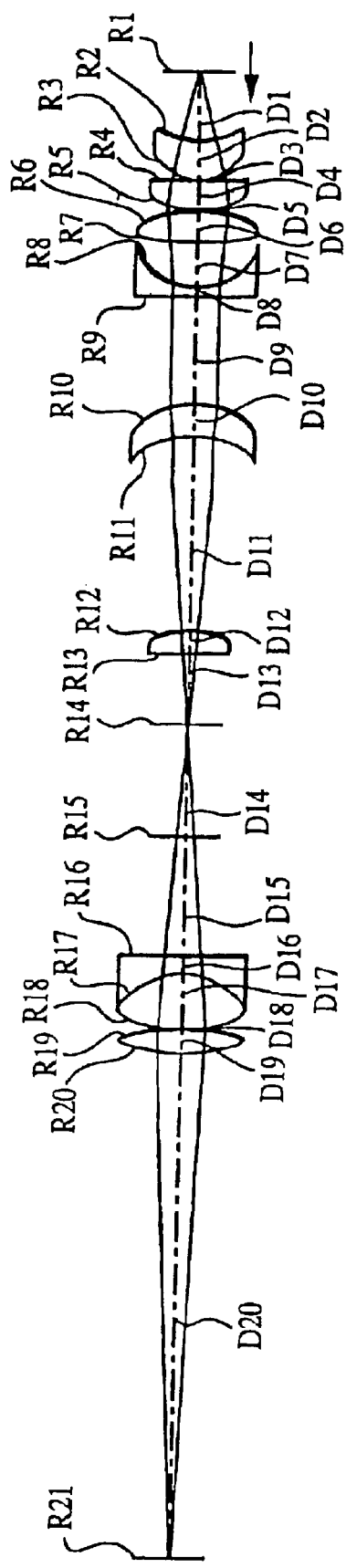
FIG. 1 shows the basic optical component configuration of an illumination optical system for a microscope according to a first embodiment of the invention.

In the present invention, an illumination optical system for a microscope is provided with a light source, an illumination lens system which gathers light from the light source and directs the light to a sample, and an object optical system which is arranged between the illumination lens system and the sample so as to illuminate the sample for observation with a microscope using either transmitted or reflected light. The microscope includes an objective lens and an imaging lens that, together, form a magnified image of the sample. The microscope also includes a condenser lens. When the sample is viewed using transmitted light, the object optical system is a condenser lens. When the sample is viewed using reflected light, the object optical system is the objective lens.

The illumination optical system of the present invention is characterized by the fact that at least one of the lens components of the illumination lens system or the light source is movable along the optical axis in order to illuminate the sample with light that is collimated during Koehler illumination, and that forms an image of the light source on the sample during critical illumination, with the following Condition (1) being satisfied:

$$0.15 < |(a \cdot f_2)/(b \cdot f_1)| < 0.5 \qquad \text{Condition (1)}$$

where
a is the diameter of the light emission region of the light source,
b is the diameter of the field of view of the microscope,
$f_1$ is the focal length of the illumination lens system, and
$f_2$ is the focal length of the object optical system.

Condition (1) controls the ratio of the size of the image of the arc from an arc-discharge lamp which is projected onto the sample surface divided by the diameter of the field of view of the microscope. When this ratio falls below the lower limit of Condition (1), the arc image becomes too small relative to the field of view of the microscope, resulting in the bright field illumination being too small upon switching to critical illumination. In this case, the focal length of the illumination optical system becomes longer, the magnification of the light source when using Koehler illumination becomes less, and the field of view becomes darker. If the above-mentioned ratio is 0.5, the diameter of the projected arc image will be one-half the diameter of the field of view of the microscope. If the upper limit of Condition (1) is not satisfied, the arc image that is projected onto the sample surface when using critical illumination becomes larger and the area of illumination becomes broader. However, the focal length of the illumination optical system becomes shorter, and the magnification of the light source when using Koehler illumination becomes too large. As a result, the numerical aperture (NA) of the cone of light rays that enters the object lens becomes smaller and it becomes difficult to provide uniform illumination when using Koehler illumination.

According to the present invention, the use of cemented lenses in those portions of the illumination optical system near an image surface of the light source is avoided by using only non-cemented lens elements near image surfaces of the light source. This avoids degradation in the transmissivity of the cement used in a cemented lens that occurs over time when such a lens is exposed to intense ultraviolet light, as occurs near an image surface of the light source when an arc light source, such as a mercury lamp, is used as the illumination light source.

Figure 3:
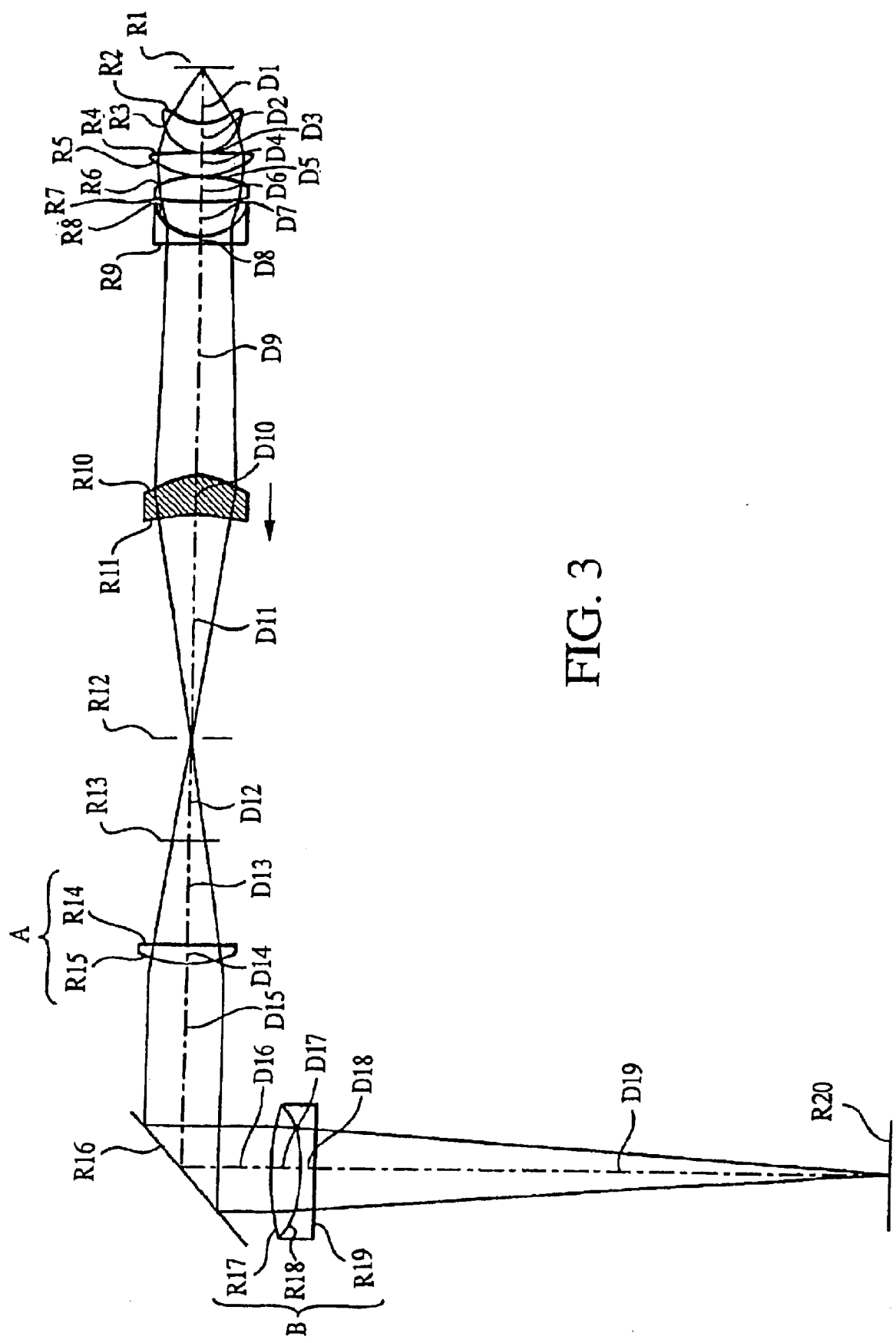
FIG. 3 shows the basic optical component configuration of an illumination optical system for a microscope according to a third embodiment of the invention.

As illustrated in FIG. 3, a field stop may be arranged within the illumination optical system at a position (surface 13) that is conjugate to the sample position. Further, a lens group A and a lens group B, each of which has positive refractive power, may be arranged between the field stop and the pupil of the objective lens, with the following Condition (2) being satisfied:

$$f_A < f_B \qquad \text{Condition (2)}$$

where
$f_A$ is the focal length of the lens group A, and
$f_B$ is the focal length of the lens group B.

The illumination optical system shown in FIG. 3 is suitable for an invert type microscope. In the invert type microscope, it is preferable for easy operation that the field stop is positioned away from the optical axis of the objective lens. But if the field stop is positioned away from the optical axis of the objective lens, the focal length (a composite focal length) of the lens group A and the lens group B becomes long. As a result, it is difficult to form an image of the field stop in a proper size. However, if the Condition (2) is satisfied, it is possible to prevent the composite focal length of the lens group A and the lens group B from becoming long.

With this construction, the focal lengths of the lens groups A and B that project the field stop to the sample can be shortened, the stop mechanism can be used in common with other illumination optical system(s), thereby saving production costs.

According to one aspect of the invention, when a microscope is used to observe a sample the microscope includes an objective lens and an imaging lens, the objective lens collimating light reflected from the sample and directing it to the imaging lens. The illumination optical system of the present invention is characterized by the fact that at least one of the lens components of the illumination lens system or the light source is moveable along the optical axis in order to change the illumination state from Koehler illumination to critical illumination, and the following Condition (3) is satisfied:

$$0.15 < |0.0273 \cdot f_3/f_1| < 0.5 \qquad \text{Condition (3)}$$

where $f_3$ is the focal length of the imaging lens of the microscope, and $f_1$ is the focal length of the illumination lens system.

Furthermore, according to the present invention, a lens group that corrects for chromatic aberrations may be arranged between the position of an image of the light source which is formed using Koehler illumination, and the position of an image of the light source which is formed using critical illumination. It is necessary that chromatic aberration of the optical system which is positioned between the field stop and object optical system is corrected. If chromatic aberration is not corrected, the image of the field stop which is projected on the sample surface has a different size and different position in each color. Preferably, rather than using a cemented lens to correct for chromatic aberrations as in prior art illumination optical systems, the present invention instead merely uses two lens elements of opposite refractive power and different dispersions. In order to avoid the degradation in optical transmission that arises over time when a cemented lens is exposed to ultraviolet radiation, the two lens elements in the present invention are made to have their adjacent surfaces either touching or spaced in air 1 mm or less (i.e., no cement is used).

According to another aspect of the present invention, a field stop is positioned at a location within the illumination lens system that is conjugate to the sample position, and a lens group that corrects for chromatic aberrations is positioned between the field stop and the object optical system. Further, the following Condition (4) is preferably satisfied by the lens group that corrects for chromatic aberrations:

$$15 < \upsilon p - \upsilon n < 50 \quad \text{Condition (4)}$$

where $\upsilon p$ is the Abbe number of the positive lens element of the lens group that corrects for chromatic aberrations, and $\upsilon n$ is the Abbe number of the negative lens element of the lens group that corrects for chromatic aberrations.

If the lower limit of Condition (4) is not satisfied, chromatic aberrations of the illumination optical system cannot be sufficiently corrected. If the upper limit of Condition (4) is not satisfied, at least one of the two glass types of the positive and negative lens elements of the lens group that corrects for chromatic aberrations will tend to absorb too much ultraviolet light, thereby diminishing the amount of ultraviolet light that is transmitted. Therefore, fluorescence observation of the sample becomes difficult.

Various embodiments for the present invention will now be explained in detail with reference to the drawings.

Embodiment 1

FIG. 1 shows the basic lens element configuration of an illumination lens system for a microscope according to a first embodiment of the invention. This embodiment is constructed so that the position of the light source, such as an arc-discharge lamp positioned at the far right side of the figure, may be moved along the optical axis in the direction of the arrow by changing the surface spacing D1 from 16.7702 to 14.6986 (i.e., by moving the light source a distance of 2.0716 mm toward the sample) in order to change the illumination state from Koehler illumination to critical illumination.

Table 1 below lists the surface numbers #, in order, beginning with the light source, the radius of curvature R (in mm) of each optical element surface, the on-axis spacing D (in mm) between surfaces, as well as the index of refraction N (at 488 nm) and the Abbe number $\upsilon_d$ (at the d line) for each lens element of Embodiment 1. In the middle portion of the table are listed the values for D1 for providing Koehler versus critical illumination to the sample. In the bottom portion of the table is listed the focal length of the illumination lens system of this embodiment. In this embodiment, when the illumination state is Koehler illumination, an image of the light source is formed at the aperture stop (R14). When the illumination state is critical illumination, an image of the light source is formed at the field stop (R15).

TABLE 1

| # | R | D | N | $\upsilon_d$ |
|---|---|---|---|---|
| 1 | (Light source) | D1 (variable) | | |
| 2 | 19.5520 | 8.9300 | 1.49268 | 70.21 |
| 3 | 13.3870 | 0.3000 | | |
| 4 | −185.1800 | 6.0000 | 1.49268 | 70.21 |
| 5 | 34.4940 | 1.0000 | | |
| 6 | −29.5740 | 8.0700 | 1.49268 | 70.21 |
| 7 | 83.2100 | 10.6300 | | |
| 8 | 18.8800 | 2.5000 | 1.60711 | 39.29 |
| 9 | 153.8230 | 26.8762 | | |
| 10 | −19.7002 | 8.0000 | 1.52236 | 64.14 |
| 11 | −24.8724 | 50.0968 | | |
| 12 | −29.3628 | 5.0000 | 1.52236 | 64.14 |
| 13 | −93.9452 | 19.5807 | | |
| 14 | ∞ (aperture stop) | 28.9600 | | |
| 15 | ∞ (field stop) | 29.0900 | | |
| 16 | 98.5500 | 3.5000 | 1.60711 | 39.29 |
| 17 | −20.0000 | 13.5000 | 1.49268 | 70.23 |
| 18 | 43.0250 | 0.4000 | | |
| 19 | −43.2730 | 7.0000 | 1.49268 | 70.23 |
| 20 | 64.2210 | 121.5000 | | |
| 21 | (objective pupil) | | | |

| | for Koehler illumination | for critical illumination |
|---|---|---|
| Value of D1: | 16.7702 | 14.6986 |

Focal length of illumination lens system for both Koehler and critical illumination = −12.27

In this case, the object optical system is an objective lens. The magnification of the objective lens is 10× (ten times), so that the focal length $f_2$ is 18.0 mm. The light source is an arc light source which is used in the microscope generally. The power of the arc light source is 100 watts, and the diameter "a" of the light emission region is 0.6 mm. An image height is 22 mm so that the diameter "b" of the field of view is 2.2 mm, and the ratio set forth above in Condition (1) has a value of 0.4, which satisfies Condition (1). With regard to Condition (3), if the focal length of the imaging lens of the microscope is 180 mm, the absolute value of ((0.0273·180)/(−12.27)) equals 0.4. Thus, Embodiment 1 also satisfies Condition (3) above.

Embodiment 2

Figure 2:
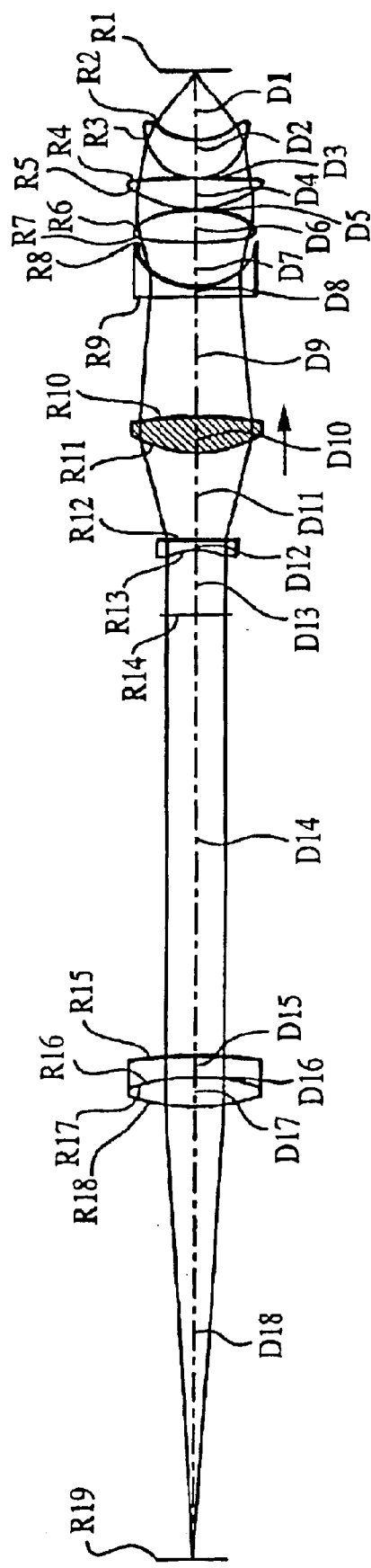
FIG. 2 shows the basic optical component configuration of an illumination optical system for a microscope according to a second embodiment of the invention.

FIG. 2 shows the basic lens element configuration of an illumination lens system for a microscope according to a second embodiment of the invention. In this embodiment, a single lens element (indicated with cross-hatching in the figure) is designed so as to be movable along the optical axis in the direction indicated by the arrow when changing from Koehler illumination to critical illumination.

Table 2 below lists the surface numbers #, in order, beginning with the light source, the radius of curvature R (in mm) of each optical element surface, the on-axis spacing D (in mm) between surfaces, as well as the index of refraction N (at 488 nm) and the Abbe number $\upsilon_d$ (at the d line) for each lens element of Embodiment 2. In the middle portion of the table are listed the values for D9 and D11 for providing Koehler versus critical illumination to the sample. In the bottom portion of the table is listed the focal length of the illumination lens system of this embodiment. In this embodiment, when the illumination state is Koehler illumination, an image of the light source is formed at the field stop (R14). When the illumination state is critical illumination, an image of the light source is formed at the pupil of the objective lens (R19).

TABLE 2

| # | R | D | N | $v_d$ |
|---|---|---|---|---|
| 1 | (Light source) | 15.5000 | | |
| 2 | 19.5520 | 8.9300 | 1.49268 | 70.21 |
| 3 | 13.3870 | 0.3000 | | |
| 4 | −185.1800 | 6.0000 | 1.49268 | 70.21 |
| 5 | 34.4940 | 1.0000 | | |
| 6 | −29.5740 | 8.0700 | 1.49268 | 70.21 |
| 7 | 83.2100 | 10.6300 | | |
| 8 | 18.8800 | 2.5000 | 1.60711 | 39.29 |
| 9 | 153.8230 | D9 (variable) | | |
| 10 | −78.8735 | 8.0000 | 1.52236 | 64.14 |
| 11 | 34.4880 | D11 (variable) | | |
| 12 | 52.6303 | 2.2000 | 1.60711 | 39.29 |
| 13 | −24.6437 | 15.8893 | | |
| 14 | ∞ (field stop) | 103.1446 | | |
| 15 | −100.9788 | 3.3600 | 1.60711 | 39.21 |
| 16 | −37.5516 | 0.0217 | | |
| 17 | −37.7820 | 7.0800 | 1.49267 | 70.23 |
| 18 | 75.0696 | 101.5000 | | |
| 19 | (objective pupil) | | | |

| | for Koehler illumination | for critical illumination |
|---|---|---|
| Value of D9: | 27.0986 | 9.9969 |
| Value of D11 | 21.9008 | 39.0025 |

Focal length of illumination lens system of this embodiment for Koehler illumination = −30.00 mm As is evident from studying Table 2 above, the value of D9 is changed from 27.0986 to 9.9969 and the value of D11 is changed from 21.9008 to 39.0025 when changing from Koehler illumination to critical illumination. This is accomplished by moving the single lens element a distance of 17.1017 mm.

In this case, the object optical system is an objective lens. The magnification of the objective lens is 10× (ten times), so that the focal length $f_2$ is 18.0 mm. The light source is an arc light source which is used in the microscope generally. The power of the arc light source is 100 watts, and the diameter "a" of the light emission region is 0.6 mm. An image height is 22 mm so that the diameter "b" of the field of view is 2.2 mm, and the ratio set forth above in Condition (1) has a value of 0.164, which satisfies Condition (1). Also, this embodiment satisfies Condition (3).

As is illustrated in FIG. 2, this lens group is arranged between the pupil of the objective lens labeled R19 and the position of the field stop during critical illumination, which is the surface labeled R14. As mentioned above, this lens group is formed using two lens elements of opposite refractive power with an on-axis spacing between the surfaces of 1 mm or less. An on-axis surface spacing of 1 mm or less in this embodiment is achieved by having the two lens elements touching at their periphery and by carefully selecting the radii of curvature of the two surfaces. On the other hand, if two lens elements used for chromatic aberration correction are set farther apart, a spacer would be required. This would cause the number of parts to increase, thereby increasing the cost of components as well as the cost of assembly. By making the circumferential edges of the two lens elements contact each other, while selecting the surface curvatures as defined in Table 2 above, an on-axis spacing of 0.0217 mm is achieved between the two lens elements of opposite refractive power. Because this spacing is nearly that which occurs with a cemented lens, chromatic aberrations can be favorably corrected just as in a cemented lens. In this way, high quality images can be provided without degradation of the optical components over time due to ultraviolet excitation causing the cement of an achromatic, cemented doublet to become non-transparent with extended usage.

Further, the above Condition (4) is satisfied.

Embodiment 3

FIG. 3 shows the basic lens element configuration of an illumination optical system for a microscope according to a third embodiment of the invention. In this embodiment, the single lens element illustrated with cross-hatching is designed to be moved along the optical axis in the direction of the arrow when changing from Koehler illumination to critical illumination.

Table 3 below lists the surface numbers #, in order, beginning with the light source, the radius of curvature R (in mm) of each optical element surface, the on-axis spacing D (in mm) between surfaces, as well as the index of refraction N (at 488 nm) and the Abbe number $v_d$ (at the d-line) for each lens element of Embodiment 3. In the middle portion of the table are listed the values for D9 and D11 for providing Koehler versus critical illumination to the sample. In the bottom portion of the table is listed the focal length of the illumination lens system of this embodiment. In this embodiment, when the illumination state is Koehler illumination, an image of the light source is formed at the aperture stop (R12). When the illumination state is critical illumination, an image of the light source is formed at the field stop (R13).

TABLE 3

| # | R | D | N | $v_d$ |
|---|---|---|---|---|
| 1 | (Light source) | 16.0010 | | |
| 2 | 19.5520 | 8.9300 | 1.48749 | 70.21 |
| 3 | 13.3870 | 0.3000 | | |
| 4 | −185.1800 | 6.0000 | 1.48749 | 70.21 |
| 5 | 34.4940 | 1.0000 | | |
| 6 | −29.5740 | 8.0700 | 1.48749 | 70.21 |
| 7 | 83.2100 | 10.6300 | | |
| 8 | 18.8800 | 2.5000 | 1.59551 | 39.29 |
| 9 | 153.8230 | D9 (variable) | | |
| 10 | −26.1226 | 12.0000 | 1.51633 | 64.14 |
| 11 | −67.7393 | D11 (variable) | | |
| 12 | ∞ (aperture stop) | 32.9900 | | |
| 13 | ∞ (field stop) | 30.9378 | | |
| 14 | −559.9970 | 5.0000 | 1.51633 | 64.14 |
| 15 | 42.6387 | 62.9106 | | |
| 16 | ∞ (reflection surface) | 30.0000 | | |
| 17 | −72.5493 | 10.0000 | 1.51633 | 64.14 |
| 18 | 36.8730 | 5.0000 | 1.59551 | 39.21 |
| 19 | 394.3018 | 196.5000 | | |
| 20 | (objective pupil) | | | |

| | for Koehler illumination | for critical illumination |
|---|---|---|
| Value of D9: | 72.6534 | 105.8781 |
| Value of D11 | 69.7591 | 36.5344 |

Focal length of illumination lens system of this embodiment for Koehler illumination = −20.91 mm As is evident from studying Table 3 above, the variable spacing D9 is changed from 72.6534 mm to 105.8781 mm, and the variable spacing D11 is changed from 69.7591 mm to 36.5344 mm when changing from Koehler to critical illumination. This is achieved by moving the single lens element of thickness D10 a distance 33.2247 mm toward the sample, as illustrated by the arrow.

In this case, the object optical system is an objective lens. The magnification of the objective lens is 10× (ten times), so that the focal length $f_2$ is 18.0 mm. The light source is an arc light source which is used in the microscope generally. The power of the arc light source is 100 watts, and the diameter "a" of the light emission region is 0.6 mm. An image height is 22 mm so that the diameter "b" of the field of view is 2.2 mm, and the ratio set forth above in Condition (1) has a value of 0.235, which satisfies Condition (1). Also, this embodiment satisfies Condition (3).

As shown in FIG. 3, a field stop (the surface labeled R13) is arranged at a position within the illumination lens system that is conjugate to the position of the sample. Lens groups A and B, each of positive refractive power, are positioned along the light path between the field stop and the pupil of the objective lens, with the lens group A positioned on the light source side and the lens group B positioned on the objective lens side. In addition, the above Condition (2) is satisfied, since $f_A$ equals 76.955 mm and $f_B$ equals 154.183 mm.

Further, a light reflection member (such as a mirror) is arranged between the lens group A and the lens group B in order to fold the optical path 900°. This prevents the position of the light source from being too remote from an operator. In addition, the lens group B is composed of a biconvex lens element and a lens element of negative refractive power which jointly correct for chromatic aberrations. The lens B is not positioned between two images of the light source which are formed by Koehler illumination or by critical illumination, respectively. But the Abbe number υp of the positive lens element is 64.14 and the Abbe number of the negative lens element υn is 39.21. Since the difference in these numbers is 24.93, Condition (4) above is satisfied.

Further, according to Embodiment 3, which is similar to Embodiment 1, the image of the light source is formed within the illumination lens system. This image is then relayed to the pupil of the objective lens, when the illumination state is Koehler illumination.

Figure 7:
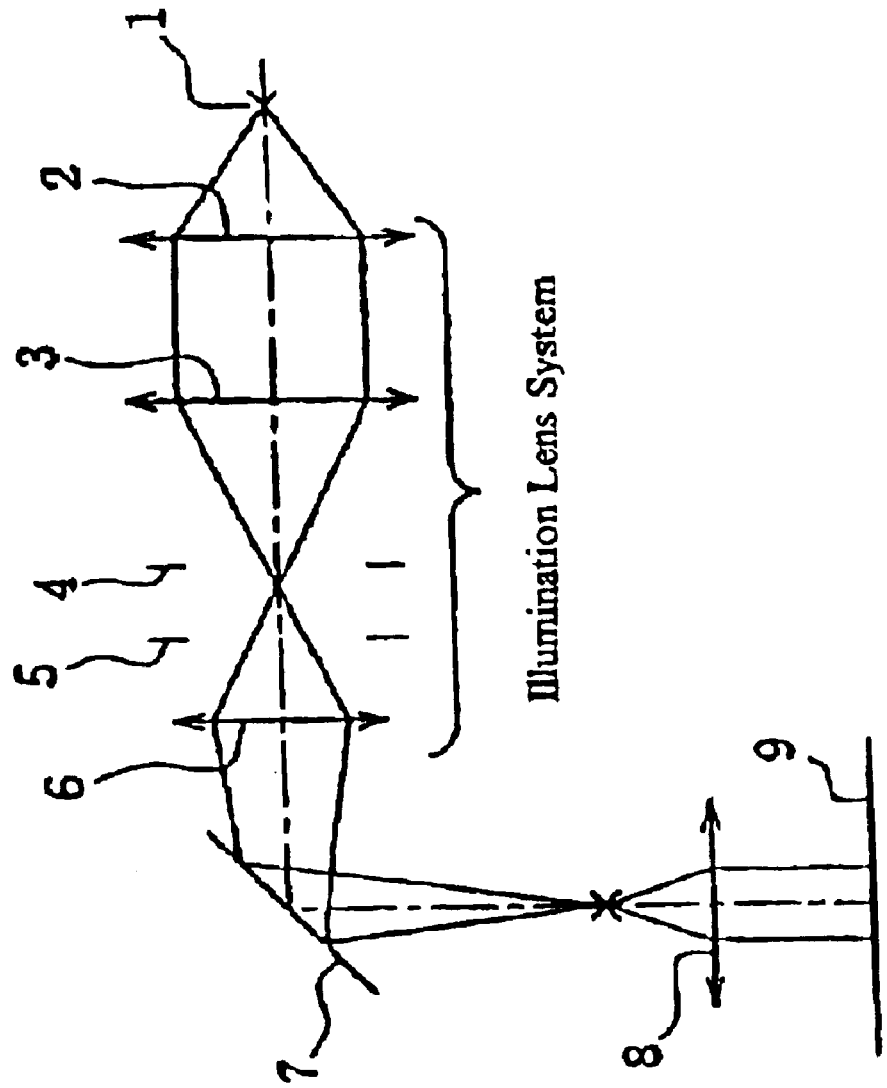
FIG. 7 is a diagram that shows a prior art optical component construction in the case of using a Koehler illumination optical system to illuminate a surface which supports a sample, with the illumination being normal to the surface.
Figure 8A:
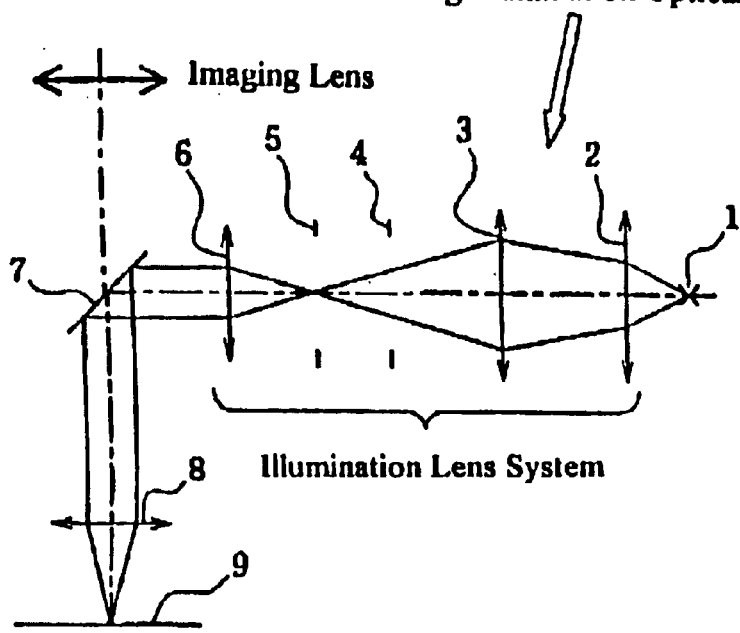
FIG. 8A shows a prior art optical component configuration in the case of using critical illumination to view a sample in reflected light.
Figure 8B:
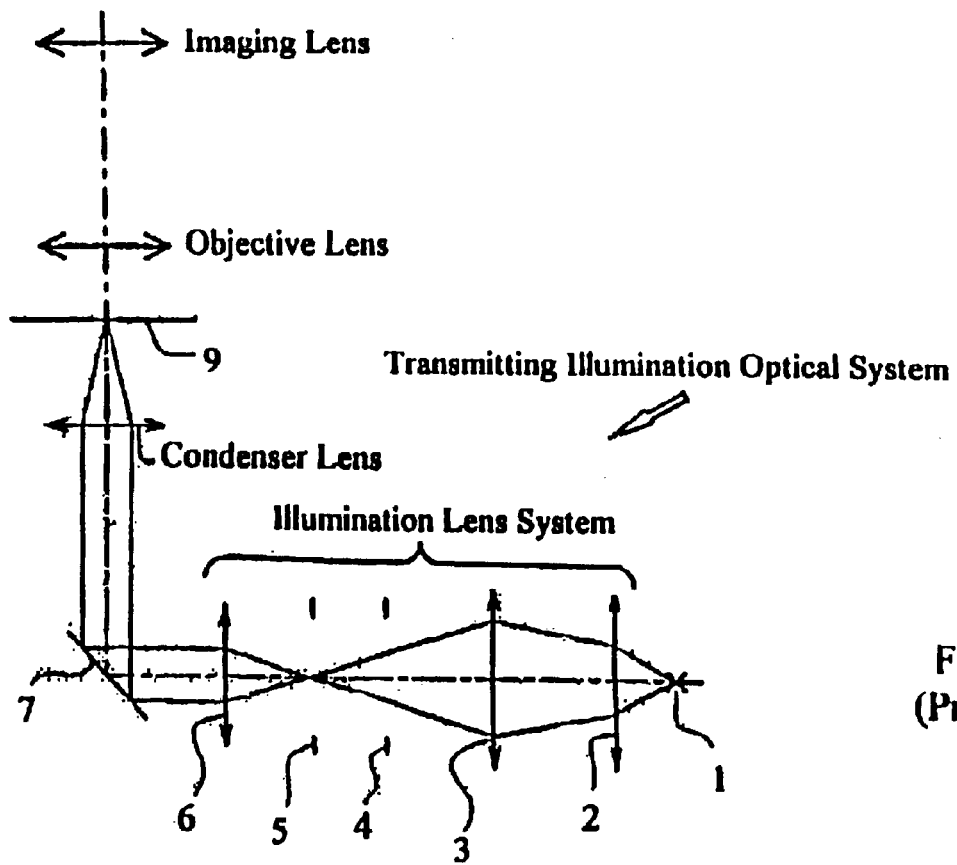
FIG. 8B shows a prior art optical component configuration in the case of using critical illumination to view a sample in transmitted light.

FIGS. 4A and 4B are schematic diagrams showing the basic configuration of optical components of the illumination optical system in the case of utilizing Embodiment 3 to provide Koehler illumination to a sample. In this case, the illumination optical system is used for the invert type microscope. FIG. 4B is a partial schematic diagram of the components of FIG. 4A as seen by a viewer looking in the direction indicated by the arrow from the position X in FIG. 4A. The components labeled as items 1–9 are the same as in prior art FIGS. 7 and 8 and thus will not be separately discussed. In FIG. 4A, there is an additional mirror 10 to fold the light path twice and a relay lens 11. By using a light path that is folded twice, a more compact illumination optical system can be provided, making it easier for the operator to reach the light source 1.

Embodiment 4

FIGS. 5A and 5B are schematic diagrams showing the basic configuration of optical components of the illumination optical system according to a fourth embodiment of the present invention. FIG. 5B is a partial schematic diagram of the components of FIG. 5A as seen by a viewer looking in the direction indicated by the arrow from position X in FIG. 5A. The components labeled as items 1–9 are the same as in prior art FIGS. 7 and 8 and thus will not be separately discussed. In this embodiment, the mirror 10 may be moved from a position where no microscope illumination light is incident to a position where light from another light source 1' is incident onto the mirror 10 via a third illumination lens 11. The distance from light source 1' to the mirror 10 is different than the distance from light source 1 to mirror 10. In addition, mirror 10 may be rotated as indicated by the curved arrow to selectively provide one of two light sources 1, 1' at different distances. This embodiment has an advantage in that the scope of the microscope observation can be broadened. Thus, by rotating the mirror as indicated between the solid and dashed lines, the light from either light source may be reflected to the sample. With this construction, the range of operability of the microscope can be enhanced.

Embodiment 5

Figure 6A:
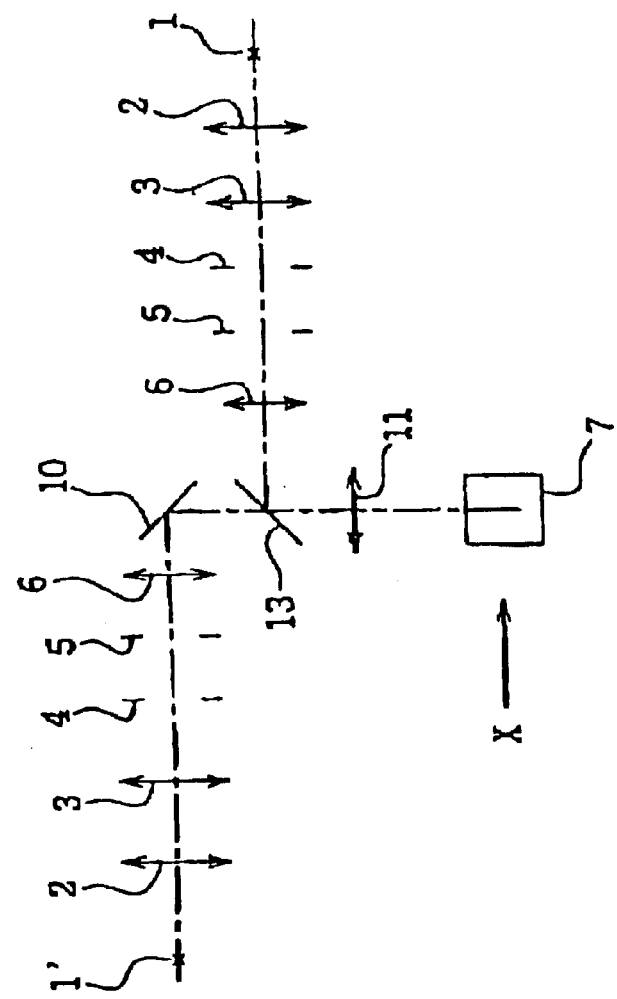
FIGS. 6A and 6B show the basic optical component configuration of the illumination optical system of a fifth embodiment of the invention.
Figure 6B:
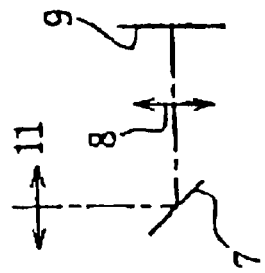

FIGS. 6A and 6B are schematic diagrams showing the basic configuration of optical components of the illumination optical system according to a fifth embodiment of the present invention. FIG. 6B is a partial schematic diagram of the components of FIG. 6A as seen by a viewer looking in the direction indicated by the arrow from position X in FIG. 6A. The components labeled as items 1–9 are the same as in prior art FIGS. 7 and 8 and thus will not be separately discussed. In this embodiment, a dichroic mirror 13 is used as a reflection member for the purpose of conveying light from a light source 1 onto the mirror 7. In addition, light from another light source 1' is conveyed onto the mirror 7 via the components 2 through 6, the mirror the dichroic mirror 13 and the third illumination lens 11. Thus, in this embodiment, two light sources 1 and 1' can simultaneously illuminate a sample for the purpose of increasing the range of microscope observation. An alternative construction would be to make the dichroic mirror 13 so as to be movable and rotatable for the purpose of enabling still another light source to be used to illuminate the sample, similar to the situation illustrated for Embodiment 4.

As mentioned above, according to the present invention, an illumination optical system for a microscope is provided wherein an appropriate illumination field and brightness can always be obtained for either Koehler illumination or critical illumination of a sample to be viewed.

The invention being thus described, it will be obvious that the same may be varied in many ways. For example, a combination of Embodiments 4 and 5 can be achieved by making the dichroic mirror 13 of Embodiment 5 both movable and rotatable while providing an additional light source. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. In an illumination optical system for a microscope, comprising
   a light source,
   an illumination lens system that gathers light from said light source and directs the light toward a sample to be viewed, an object optical system positioned between said illumination lens system and said sample, the improvement of:

making adjustable one of the light source position along the optical axis or the focal length of the illumination optical system so that illumination state changes from Koehler illumination to critical illumination, respectively, the following condition is satisfied:

$$0.15<|(a\cdot f_2)/(b\cdot f_1)|<0.5$$

where a is the diameter of the light source, b is the diameter of the microscope field of view, $f_1$ is the focal length of the illumination lens system, and $f_2$ is the focal length of the object optical system; and wherein said lens group includes a lens elements having a positive refractive power and a lens element having a negative refractive power which, on axis, are touching or spaced in air a distance of 1 mm or less.

2. The illumination optical system for a microscope as set forth in claim 1, wherein a field stop is positioned within the illumination optical system conjugate to the sample surface, and the positive and negative lens elements have respective convex and concave surfaces that touch, said positive and negative lens elements being arranged between the field stop and the object lens.

3. The illumination optical system for a microscope as set forth in claim 1, wherein the positive and negative lens elements which, on axis, are touching or spaced in air a distance of 1 mm or less satisfy the following condition:

$$15<\upsilon p-\upsilon n<50$$

where $\upsilon p$ is the Abbe number of the positive lens element, and $\upsilon n$ is the Abbe number of the negative lens element.

4. In an illumination optical system for a microscope, comprising a light source, an illumination lens system that gathers light from said light source and directs the light toward a sample to be viewed, an object optical system positioned between said illumination lens system and said sample, the improvement of:

making adjustable one of the light source position along the optical axis or the focal length of the illumination optical system so that the illumination state changes from Koehler illumination to critical illumination, respectively, and the following condition is satisfied:

$$0.15<|(a\cdot f_2)/(b\cdot f_1)|<0.5$$

where a is the diameter of the light source, b is the diameter of the microscope field of view, $f_1$ is the focal length of the illumination lens system, and $f_2$ is the focal length of the object optical system; and wherein said lens group includes a lens element having a positive power and a lens element having a negative refractive power which, on axis, are touching or spaced in air a distance of 0.3 mm or less.

* * * * *